United States Patent
Yamashita

(10) Patent No.: US 10,412,301 B2
(45) Date of Patent: Sep. 10, 2019

(54) IMAGE PROCESSING APPARATUS AND IMAGE CAPTURING APPARATUS

(71) Applicant: CANON KABUSHIKI KAISHA, Tokyo (JP)

(72) Inventor: Tomoya Yamashita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/892,710

(22) Filed: Feb. 9, 2018

(65) Prior Publication Data
US 2018/0234625 A1    Aug. 16, 2018

(30) Foreign Application Priority Data
Feb. 15, 2017    (JP) ................. 2017-026363

(51) Int. Cl.
  *H04N 5/232*    (2006.01)
(52) U.S. Cl.
  CPC ..... *H04N 5/23229* (2013.01); *H04N 5/23245* (2013.01)
(58) Field of Classification Search
  CPC .............. H04N 5/23229; H04N 5/23245
  See application file for complete search history.

(56) References Cited

U.S. PATENT DOCUMENTS

| | | | | |
|---|---|---|---|---|
| 7,961,194 B2* | 6/2011 | Bakalash | ............. | G06F 9/5044 345/502 |
| 2006/0264733 A1* | 11/2006 | Masaki | ................. | H04N 5/232 600/407 |
| 2008/0106603 A1* | 5/2008 | Whitehead | ............. | H04N 5/232 348/207.1 |
| 2010/0157090 A1* | 6/2010 | Kobayashi | ............... | H04N 5/77 348/222.1 |
| 2012/0098987 A1* | 4/2012 | Tsuda | ................... | H04N 1/2141 348/222.1 |
| 2012/0120256 A1* | 5/2012 | Hwang | ...................... | G06T 1/20 348/207.1 |
| 2014/0198255 A1* | 7/2014 | Kegasawa | ................ | H04N 5/91 348/571 |
| 2015/0172688 A1* | 6/2015 | Maeda | ................. | H04N 19/436 375/240.26 |
| 2018/0177382 A1* | 6/2018 | Yagi | ......................... | G06T 1/00 |

FOREIGN PATENT DOCUMENTS

JP    2004-172978 A    6/2004

* cited by examiner

*Primary Examiner* — Timothy J Henn
(74) *Attorney, Agent, or Firm* — Cowan, Liebowitz & Latman, P.C.

(57) ABSTRACT

An image capturing apparatus cascade-connects an image processing circuit of a preceding stage and an image processing circuit of a succeeding stage and switches, in accordance with an image processing load, the method of processing so as to process image data from an image capturing unit by an image processing circuit of the preceding stage or the succeeding stage on a frame-by-frame basis, or so as to process the image data alternately by the image processing circuits of the preceding stage and the succeeding stage on a frame-by-frame basis, or so as to process half of a frame by the image processing circuit of the preceding stage and process the remaining half of the frame by the image processing circuit of the succeeding stage.

6 Claims, 9 Drawing Sheets

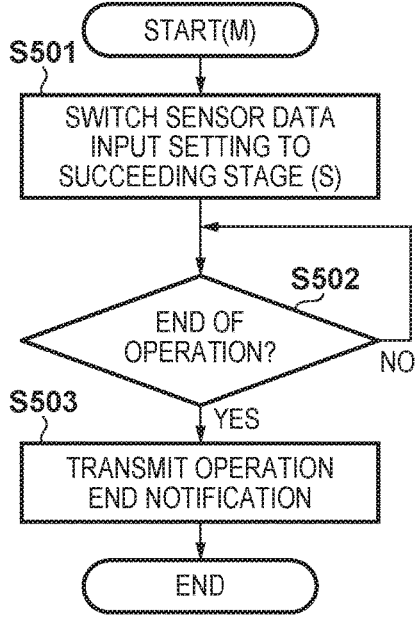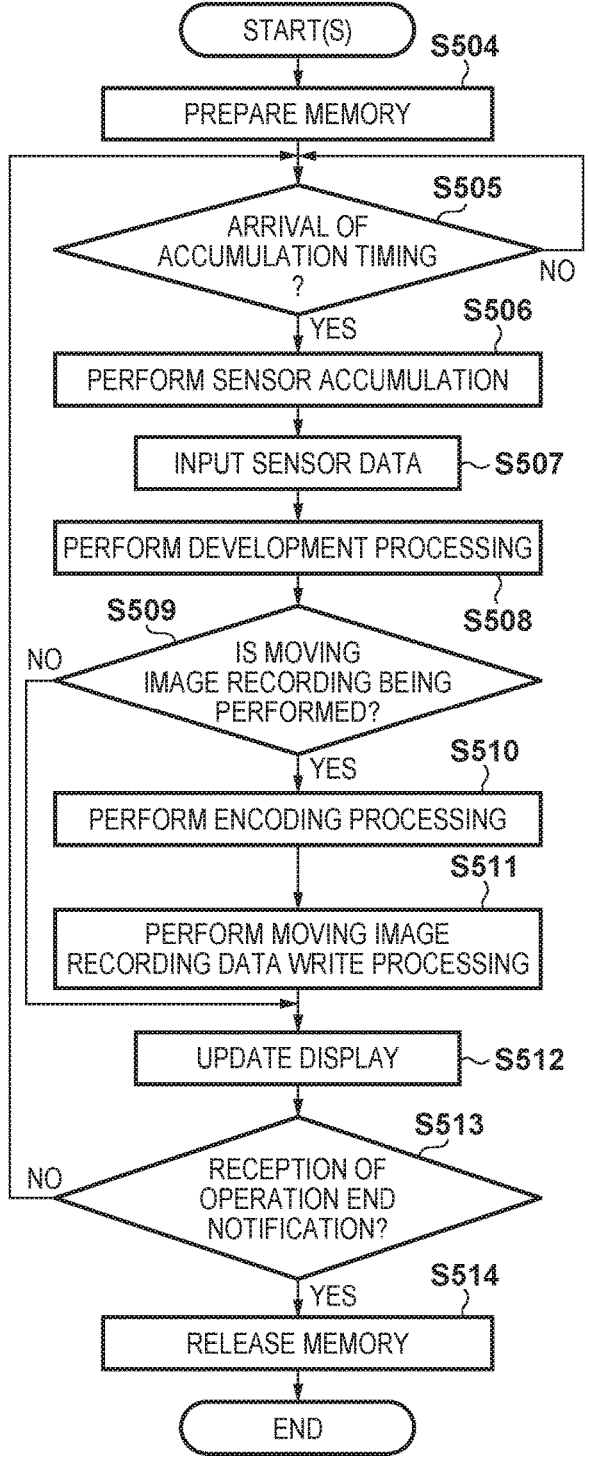

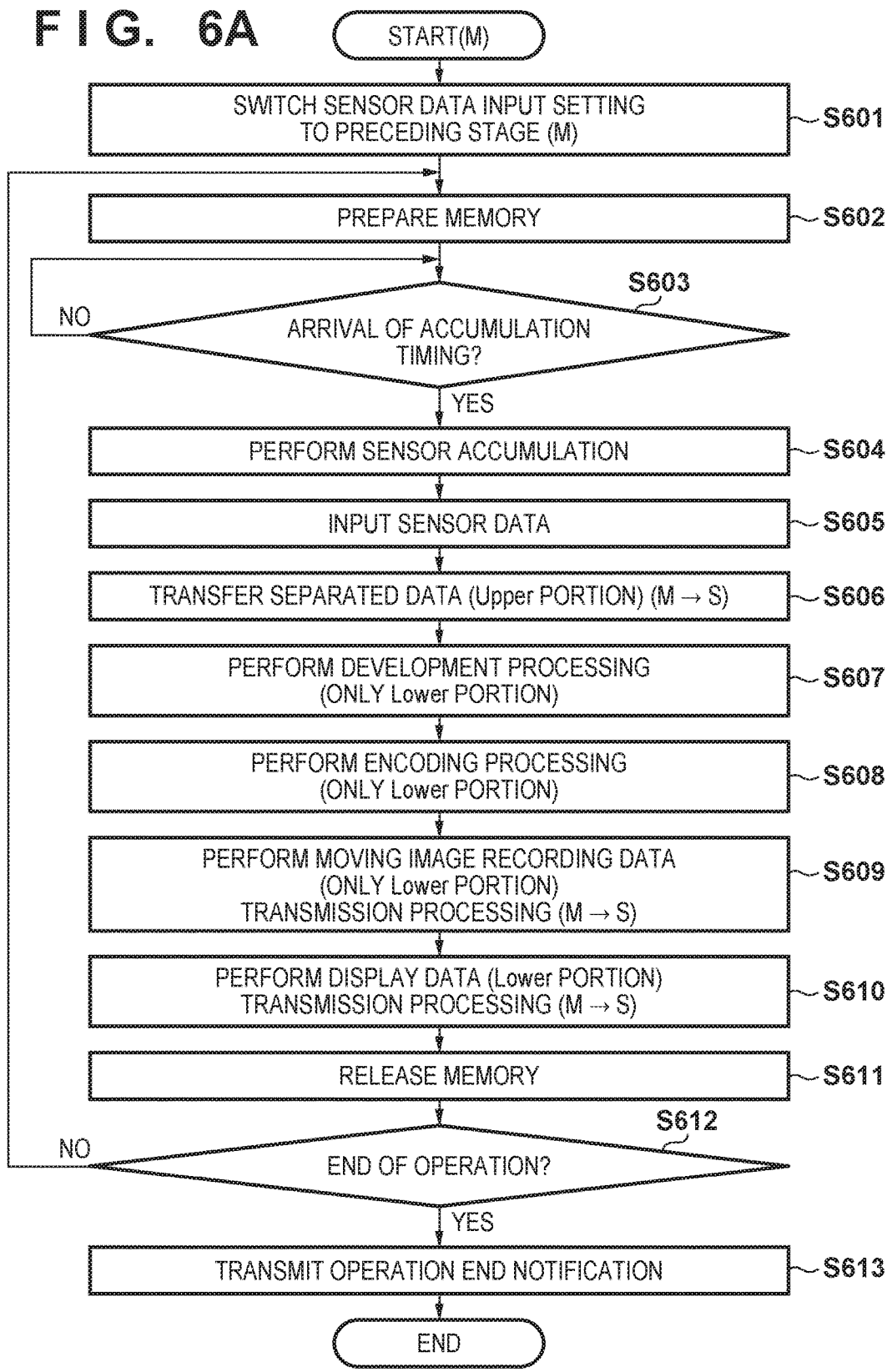

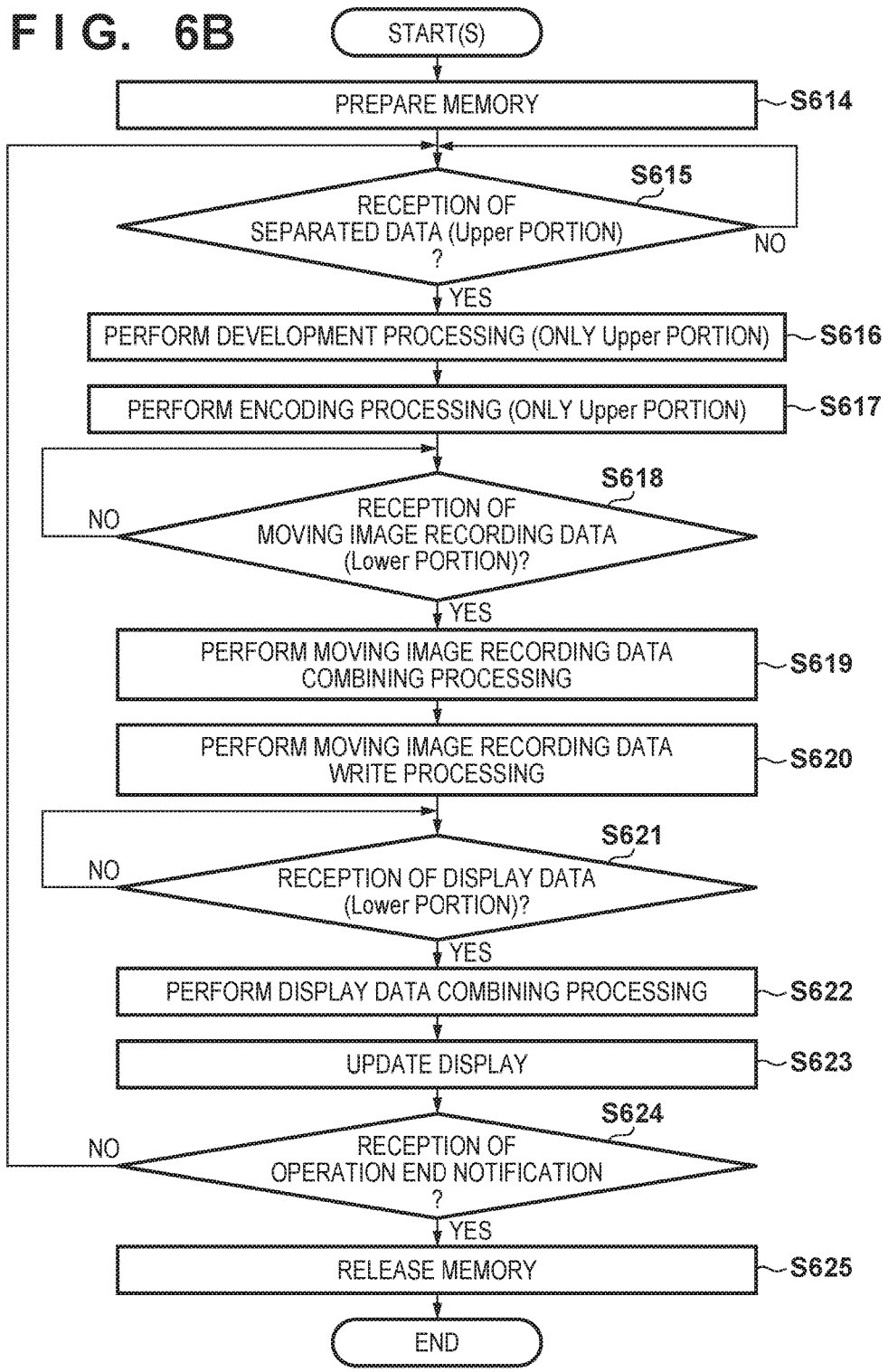

IMAGE PROCESSING APPARATUS AND IMAGE CAPTURING APPARATUS

BACKGROUND OF THE INVENTION

Field of the Invention

The present invention relates to an image capturing apparatus, particularly, an image processing apparatus and image capturing apparatus provided with image capturing control that can perform still image recording and moving image recording by efficiently using a plurality of image processing circuits.

Description of the Related Art

Conventionally, as a solution to an image processing load increasing with the increase in the number of pixels of an image sensor, there are disclosed various kinds of techniques related an image capturing apparatus that performs still image recording and moving image recording by using a plurality of image processing circuits (Japanese Patent Laid-Open No. 2004-172978).

However, in the conventional techniques disclosed in the above-described patent literature, particularly, there is no mention of a cooperative operation in controlling a plurality of image processing circuits. Hence, the processing efficiency improvement rate from using a plurality of image processing circuits is determined by the processing speed of each single image processing circuit, and the conventional techniques have parts that cannot flexibly and efficiently cope with the aforementioned increasing processing load.

SUMMARY OF THE INVENTION

The present invention provides an image processing apparatus and an image capturing apparatus that can flexibly and efficiently cope with an increasing processing load by providing a cooperative operation function of controlling a plurality of image processing circuits to suitably distribute the processing load of each image processing circuit.

According to the first aspect of the present invention, there is provided an image processing apparatus comprising: a first image processing unit configured to perform image processing on image data output from an image capturing unit; and a second image processing unit configured to perform image processing on the image data output from the image capturing unit, wherein the image processing on the image data can be switched between a first processing mode and a second processing mode, wherein in the first processing mode, image processing is performed by one of the first image processing unit and the second image processing unit on a frame-by-frame basis, and in the second processing mode, a first portion of the image data of one frame is processed by the first image processing unit, a second portion different from the first portion is processed by the second image processing unit, and the processed portions of the image data are combined.

Alternatively, according to the second aspect, there is provided an image capturing apparatus comprising: an image capturing unit; a first image processing circuit to which image data output from the image capturing unit is input; and a second image processing circuit that is cascade-connected to the first image processing circuit, wherein the first image processing circuit when processing the image data from the image capturing unit as a moving image, processes, if a data rate of moving image data to be processed exceeds a predetermined data rate, a first portion of each frame of the image data from the image capturing apparatus by the first image processing circuit and transfers a second portion to the second image processing circuit without processing the second portion by the first image processing circuit, and the first image processing circuit processes, if the data rate of the moving image data to be processed does not exceed the predetermined data rate, the image data of each frame by the first image processing circuit or transfers the image data from the image capturing unit to the second image processing circuit without processing the image data by the first image processing circuit, when the image data from the image capturing unit is to be processed as a still image, the image data of one frame of every other frame from the image capturing unit is processed by the first image processing circuit and the image data of a frame other than the one frame is transferred to the second image processing circuit, the image data processed by the first image processing circuit is transferred to the second image processing circuit, and the second image processing circuit processes unprocessed image data input from the first image processing unit and combines the processed unprocessed image data input from the first image processing unit with the processed image data input from the second image processing circuit.

According to the present invention, by providing a cooperative operation function of controlling a plurality image processing circuits, an image processing apparatus and an image capturing apparatus that can flexibly and efficiently cope with an increasing processing load can be provided.

Further features of the present invention will become apparent from the following description of exemplary embodiments with reference to the attached drawings.

BRIEF DESCRIPTION OF THE DRAWINGS

FIGS. 5A and 5B are flowcharts of full-frame succeeding stage processing according to the embodiment of the present invention.

FIGS. 6A and 6B are flowcharts of half-frame parallel processing according to the embodiment of the present invention.

DESCRIPTION OF THE EMBODIMENTS

<Arrangement of Image Capturing Apparatus>

Figure 1:
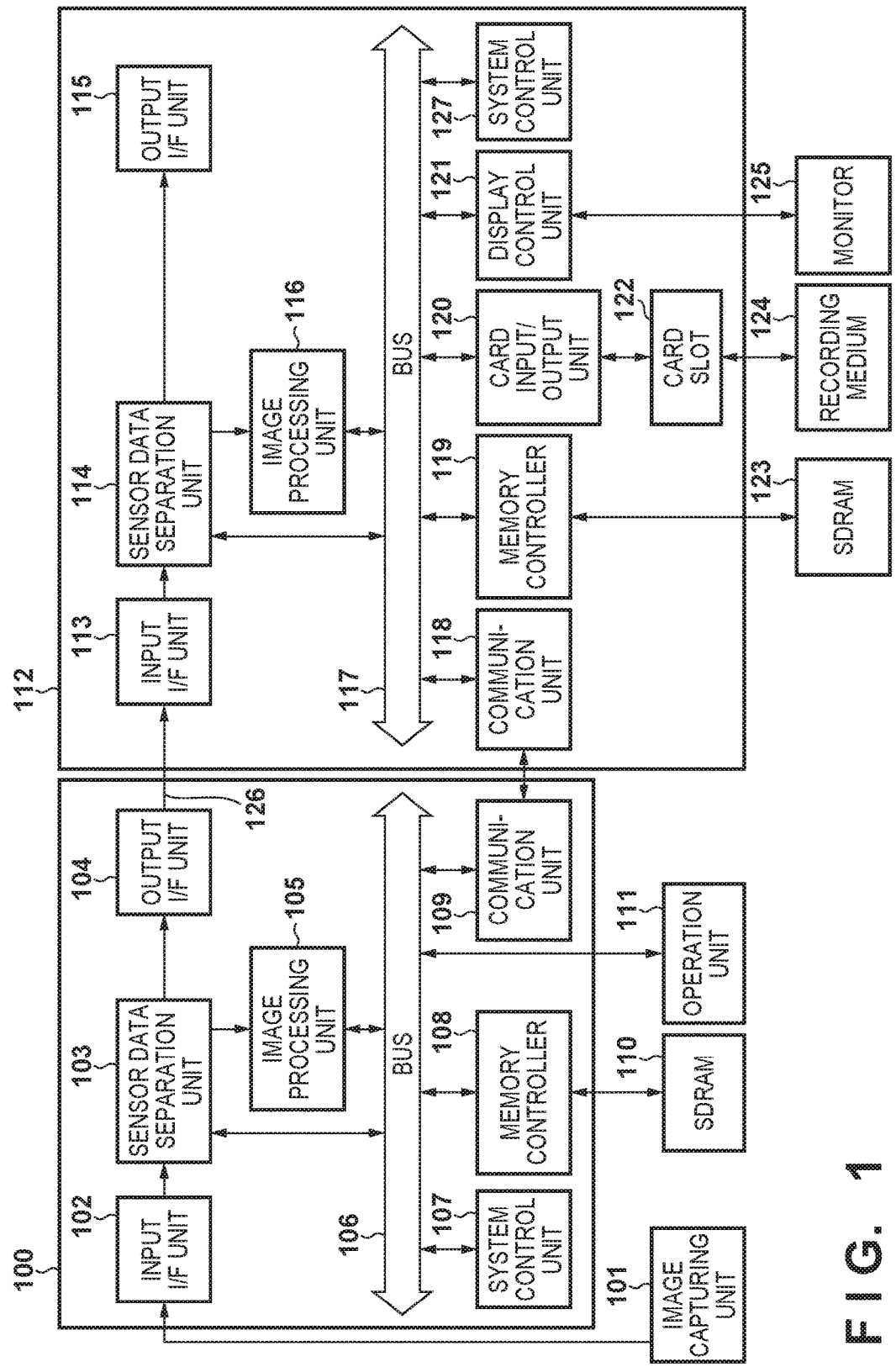
FIG. 1 is a block diagram of an image capturing apparatus according to an embodiment of the present invention.

Preferred embodiments of the present invention will be described in detail hereinafter based on the accompanying drawings. An embodiment of the present invention will be described first with reference to FIG. 1. FIG. 1 is a block diagram showing the arrangement of an image capturing apparatus (or an image capturing system) according to the first embodiment of the present invention. The image capturing apparatus according to the embodiment includes two image processing circuits 100 and 112 that are serially cascade-connected to an image data path. The image processing circuits 100 and 112 have the same circuit arrangement, and the circuits can be provided by, for example, using identical semiconductor chips. However, note that different processing targets can be set by, for example, using different parameter settings. The image capturing apparatus may be, for example, a single-lens reflex camera that has a function to record both a moving image and a still image.

In the image capturing apparatus shown in FIG. 1, the upstream side of the cascade connection will be referred to as a preceding stage, and the downstream side will be referred to as a succeeding stage. Alternatively, the preceding stage and the succeeding stage may be referred to as a master and a slave, respectively. In the image capturing apparatus of FIG. 1, these two image processing circuits will be used to process a moving image (to be referred to as 4K60P) of 60 frames per second (fps) in which one image (one frame) obtained by an image capturing unit 101 has 3840 horizontal pixels×2160 vertical pixels (4K2K image). The image capturing unit 101 outputs a digital image signal obtained by A/D-converting an output signal in a solid-state image sensor. Each of the image processing circuits 100 and 112 has the capability to process, in real time, a moving image with a frame size of 3840 horizontal pixels×2160 vertical pixels and a frame rate of 30 fps. That is, each image processing circuit can process a moving image having a data rate corresponding to 4K30P or less. In other words, there is a capability to process a moving image with a frame size of 3840 horizontal pixels×1080 vertical pixels and a frame rate of 60 fps. This processing capability means that, after performing image processing, image data can be output at the same rate as the input frame rate or at a high frame rate. Hence, in this embodiment, a moving image is processed either by processing the upper half and the lower half of each frame of a moving image in corresponding image processing circuits (to be referred to as a half-frame parallel processing mode hereinafter) or by switching the image processing circuits alternately for each frame (to be referred to as a full-frame alternate processing mode). A 4K60P moving image, that is, a moving image with a frame size of 3840 horizontal pixels×2160 vertical pixels and a frame rate of 60 fps will be processed in this manner. Note that in this embodiment, the full-frame alternate processing mode is applied to a still image and the half-frame parallel processing mode is applied to a moving image. One of the reasons for switching the processing modes in this manner is because the processing needs to meet the frame rate in the case of a 4K60P moving image. Hence, in the case of the 4K60P moving image, each image processing circuit is arranged to process the corresponding one of the upper and the lower halves of each frame in a standardized manner and to combine them. In contrast, in the case of a still image, the frame size is not limited to 4K and can be arbitrarily selected, and the processing for a 4K60P moving image need not be performed since it is not restricted by frame rate. Hence, full-frame processing is performed on a still image to flexibly perform processing in accordance with parameters such as the image size and the like. In addition, another reason for switching the processing modes is power consumption. Since the half-frame parallel processing consumes more power than the full-frame alternate processing, the full-frame alternate processing which consumes less power will be adopted when there are no restrictions such as the requirement to make the processing meet the frame rate of a 4K60P image. In consideration of the disadvantages of the half-frame parallel processing, the full-frame alternate processing is adopted for cases other than those that require the half-frame parallel processing. Note that although the image processing circuits 100 and 112 are to process the upper and lower halves, respectively, of one frame in the half-frame parallel processing mode, this does not mean that the processing will be performed by completely dividing the frame into upper and lower portions. In this embodiment, a portion on the upper side and a portion on the lower side of one frame will be called an upper half and a lower half, respectively, and their border portions may partially overlap. This overlapping portion is data necessary for image processing in each processing circuit.

The image processing circuit 100 on the upstream side extracts, from the moving image data from the image capturing unit 101, the image data of a portion which the circuit is to process and transmits the remaining portion of moving image data to the image processing circuit 112 on the downstream side. In addition, the image processing circuit 100 transmits the processed moving image data which it has processed to the image processing circuit 112 via a transfer path. Also, the image processing circuits 100 and 112 are each formed as a single semiconductor integrated circuit (LSI) and have the same arrangement. This embodiment has an arrangement in which the image capturing unit 101 and the plurality of image processing circuits are series-connected in this manner. The image capturing unit 101 outputs, at a predetermined frame rate, image data that has a frame size (pixel count of one frame) corresponding to the size of the image sensor (pixel count of the image sensor).

<Arrangement of Image Processing Circuit 100>

The image processing circuit 100 will be described first. In the image capturing apparatus, the image capturing unit 101 photoelectrically converts an object image and outputs digital image data of a predetermined size at a predetermined frame rate. An input I/F unit 102 receives the image data output from the image capturing unit 101 as input data. A sensor data separation unit 103 separates the image data output from the image capturing unit 101 into data to be processed by the image processing circuit 100 and data to be processed by the image processing circuit 112 of the succeeding stage, and writes the data to be processed by the image processing circuit 100 in an SDRAM 110 via a memory bus 106 and a memory controller 108. That is, the sensor data is divided in accordance with the image data of the portions that the plurality of image processing circuits 100 and 112 are in charge of processing.

An image processing unit 105 reads out the data separated by the sensor data separation unit 103 and written in the SDRAM 110 and performs image processing such as pixel interpolation, filter processing, resize processing such as image reduction, color conversion processing, and processing to covert the format of the image data to the YCbCr-format, which is the most suitable format for storing compressed image data. The image processing unit 105 stores the processed image data in the SDRAM 110 via the memory bus 106 and the memory controller 108.

The SDRAM 110 is a large-capacity memory that can store moving image data of a plurality of frames in an uncompressed state. The SDRAM 110 is formed as a semiconductor integrated circuit which is separate from the image processing circuit 100.

In response to access requests from a plurality of bus masters, the memory controller 108 selects one bus master in accordance with a preset priority and controls the data transfer to/from the SDRAM 110. That is, the SDRAM 110 can be time-divisionally accessed by the plurality of bus masters. The processed data read out from the SDRAM 110 and the sensor data transmitted from the sensor data separation unit 103 are packetized into packets of a predetermined size, each packet is added with an identification header, and the resultant data is transmitted from an output I/F unit 104 to the image processing circuit of the succeeding stage.

A system control unit 107 includes a microcomputer and controls the operation of the image processing circuit 100 by executing a program recorded in a non-volatile memory (not shown). The system control unit 107 controls the overall operation of the image capturing apparatus in accordance with the instructions from an operation unit 111. The operation unit 111 includes a power switch and other switches for the user to operate.

A communication unit 109 communicates with the other image processing circuit. Communication contents include, for example, not only image data but also data related to the control of each image processing circuit such as transmission of set parameters.

The image processing circuit 112 will be described next. A transfer path 126 connects the output I/F unit 104 and an input I/F unit 113. In this embodiment, assume that SLVS (Scalable Low-Voltage Signaling) will be performed as an example. The input I/F unit 113 receives data output from the output I/F unit 104 of the image processing circuit 100 of the preceding stage. A sensor data separation unit 114 separates the sensor data to be processed by the image processing circuit 112 from the data received by the input I/F unit 113 and writes the separated data to be processed by the image processing circuit 112 in an SDRAM 123 via a memory bus 117 and a memory controller 119.

An image processing unit 116 reads out, from the SDRAM 123, the data separated by the sensor data separation unit 114 and performs image processing such as pixel interpolation, filter processing, resize processing such as image reduction, color conversion processing, and processing to covert the format of the image data to the YCbCr-format, which is the most suitable format for storing compressed image data. The image processing unit 116 stores the processed image data in the SDRAM 123 via the memory bus 117 and the memory controller 119.

The SDRAM 123 is a large-capacity memory that can store moving image data of a plurality of frames in an uncompressed state. The SDRAM 123 is formed as a semiconductor integrated circuit separate from the image processing circuit 112. Also, in this embodiment, the SDRAM 110 and the SDRAM 123 are formed as separate semiconductor integrated circuits.

A display control unit 121 reads out, via the memory bus 117 and the memory controller 119, image data that has undergone development processing and outputs the image data to a monitor 125. A system control unit 127 includes a microcomputer and controls the operation of the image processing circuit 112 by executing a program recorded in a non-volatile memory (not shown).

A communication unit 118 communicates with the other image processing circuit. In the arrangement of FIG. 1, the communication unit communicates with the communication unit 109 of the image processing circuit 100.

A detachable recording medium 124, for example, an SD card or the like can be inserted into a card slot 122. While it is inserted in the card slot 122, the recording medium 124 is electrically connected to a card input/output unit 120. In this state, the image data recorded in the SDRAM 123 can be recorded in the recorded medium 124. The image processing circuit 112 can also read out the data stored in the recording medium 124.

The card input/output unit 120, the display control unit 121, and the system control unit 127 are not used in the image processing circuit 100 but may be included in the image processing circuit 100 in the same manner as the image processing circuit 112.

<Shooting Processing Procedure>

The overall procedure shown in FIG. 2 will be described next. Since terms such as "full frame", "half frame", "preceding stage", and "succeeding stage" frequently appear in this embodiment, a description of these terms will be given first. The terms "full frame" and "half frame" refer to the input data from the sensor; input data that corresponds to a full frame, that is, one frame will be called a "full frame", and data that is obtained by separating one frame into an upper half and a lower half will be called a "half frame". Also regarding the terms "preceding stage" and "succeeding stage" as described above, the upstream side of the cascade connection that is seen from the image processing circuits will be called the "preceding stage", and the downstream side that is seen from the image processing circuits will be called the "succeeding stage". Note that as will be described later, due to the circumstance of the processing, there can be an overlapping portion even when the data is called a half frame, and each of the image processing circuits has a capability to perform processing that includes the overlapping portion.

Figure 2:
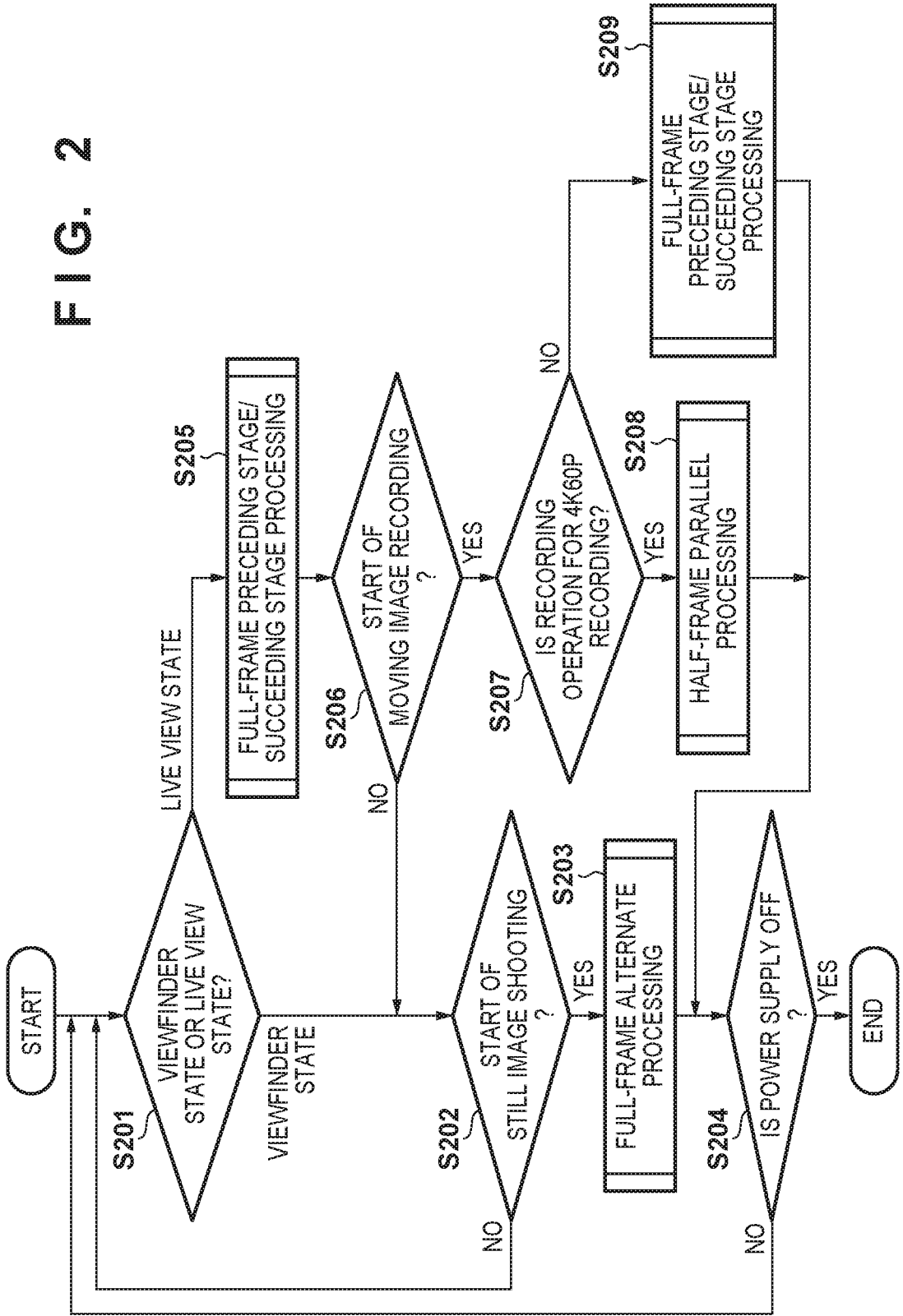
FIG. 2 is a flowchart of the overall control processing according to the embodiment of the present invention.

The processing of FIG. 2 is executed by the system control unit 107 of the image processing circuit 100, particularly, a processor (not shown) incorporated in the system control unit 107. That is, in this embodiment, although the image processing circuit 100 performs the role of controlling the overall operation of the image capturing apparatus such as the division of the sensor data, the processor for controlling the overall image capturing apparatus can be provided separately. In this case, it is desirable for this processor to execute the procedures of FIG. 2. When a user operates the operation unit 111 and turns on the power supply of the image capturing apparatus, the image capturing apparatus changes to a shooting standby state. In this shooting standby state, first, the processor determines whether the apparatus is in a viewfinder state or a live view state (step S201). A viewfinder state is a state in which the image capturing unit 101 does not perform exposure and no sensor data is output. For example, in the case of a single-lens reflex camera, it is a state in which the quick return mirror is kept lowered. On the other hand, a live view state is a state in which the monitor 125 is displaying an image shot by the image capturing unit 101. For example, in the case of a single-lens reflex camera, it is a state in which the quick return mirror is kept raised. Whether the apparatus is set to the viewfinder state or the live view state is designated by, for example, the state of the operation unit that switches the states. For example, if the state is to be stored in a memory, it is possible to perform the determination of step S201 by referring to this state. Although a still image is shot in the viewfinder state and a moving image is shot in the live view state in this embodiment, a still image may be shot in the live view state. Note that terms such as the "viewfinder state" and the "live view state" are terms that have been set assuming that the image capturing apparatus of this embodiment will be implemented in the form of a single-lens reflex camera. Hence, the determination of step S201 can be more generally referred to as a determination as to whether the apparatus is to perform moving image shooting or a still image shooting. In the case of a moving image, the process will branch to step S205. In the case of a still image, the process will branch to step S202.

In the case of viewfinder state, next, the processor determines whether still image shooting has started (step S202).

Since an operation switch (release button) of the operation unit 111 differs for still image shooting and for moving image shooting or since set operation modes can differ from each other, this determination can be also made based on these switches and modes. If the start of still image shooting is determined, processing in the full-frame alternate processing mode is started as a series of control operations in still image shooting (step S203). The details of this processing will be described later with reference to FIGS. 3A and 3B. When the processing by the full-screen alternate processing mode has ended, the processor determines whether the power supply is OFF (step S204). If it is determined that the power supply is OFF, the processing ends. Otherwise, the process returns to the beginning.

On the other hand, if the live view state is determined in step S201, processing in a full-screen preceding stage/succeeding stage processing mode is started as a series of control operations in the live view state (step S205). The details of this processing will be described later with reference to FIGS. 4A, 4B, 5A, and 5B. Both processes of the full-screen preceding stage/succeeding stage processing need not be performed, and it is sufficient to perform either the full-screen preceding stage processing or the full-frame succeeding stage processing. In step S205, the sensor data is developed and displayed on the monitor 125. Hence, an image that has undergone the image processing in step S205 can be an image matching the size of the monitor 125. The size of the monitor 125 is sufficiently small compared to that of a 4K image and is, for example, about a few hundred pixels×a few hundred pixels. Next, when the full-screen preceding stage/succeeding stage processing is complete, the processor determines whether moving image recording has started (step S206). If the start of the moving image recording is determined, the processor next determines whether the recording operation is 4K60P moving image recording (step S207). If the 4K60P moving image recording is determined, the half-frame parallel processing is started (step S208). Otherwise, the full-frame preceding stage/succeeding stage processing is started (step S209). The details of the processing in the half-frame parallel processing mode will be described later with reference to FIGS. 6A and 6B. The half-frame parallel processing is also called division processing or division parallel processing. Also, a case in which the 4K60P moving image recording is not determined in step S207 is a case in which the data rate is equal to or less than a data rate corresponding to 4K30P. Step S208 will also be executed when the data rate of a recording mode will greatly exceed 4K30P. After the completion of the aforementioned processes, the processor determines whether the power supply is OFF (step S204). If it is determined that the power supply is OFF, the processing ends. Otherwise, the process returns to the beginning. In FIG. 2, one of the image processing circuits performs processing on a frame-by-frame basis in steps S203, S205, and S209. In step S208, both of the image processing circuits perform distributed processing of one frame.

<Full-Frame Alternate Processing>

Figure 3A:
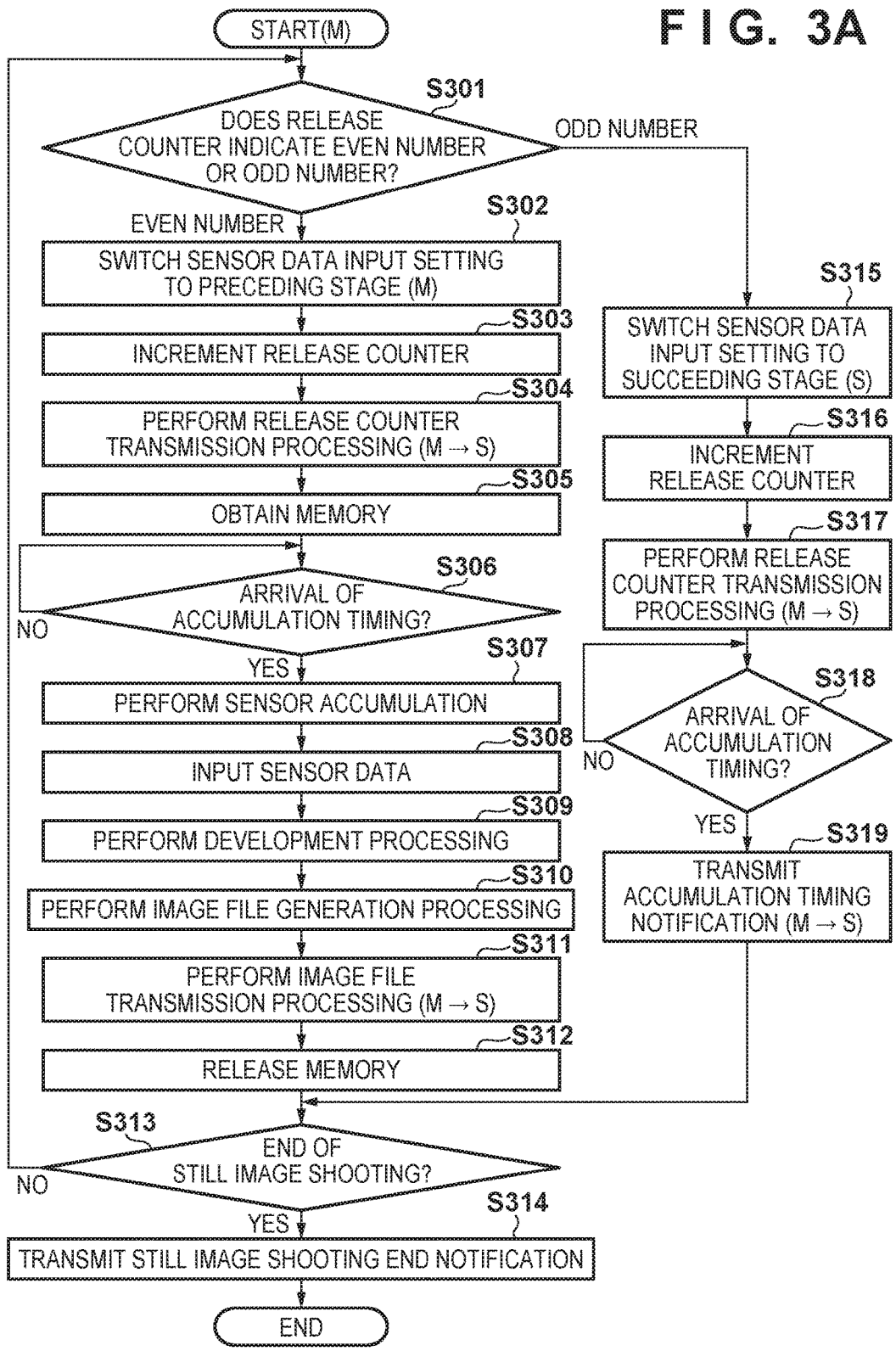
FIGS. 3A and 3B are flowcharts of full-frame alternate processing according to the embodiment of the present invention.
Figure 3B:
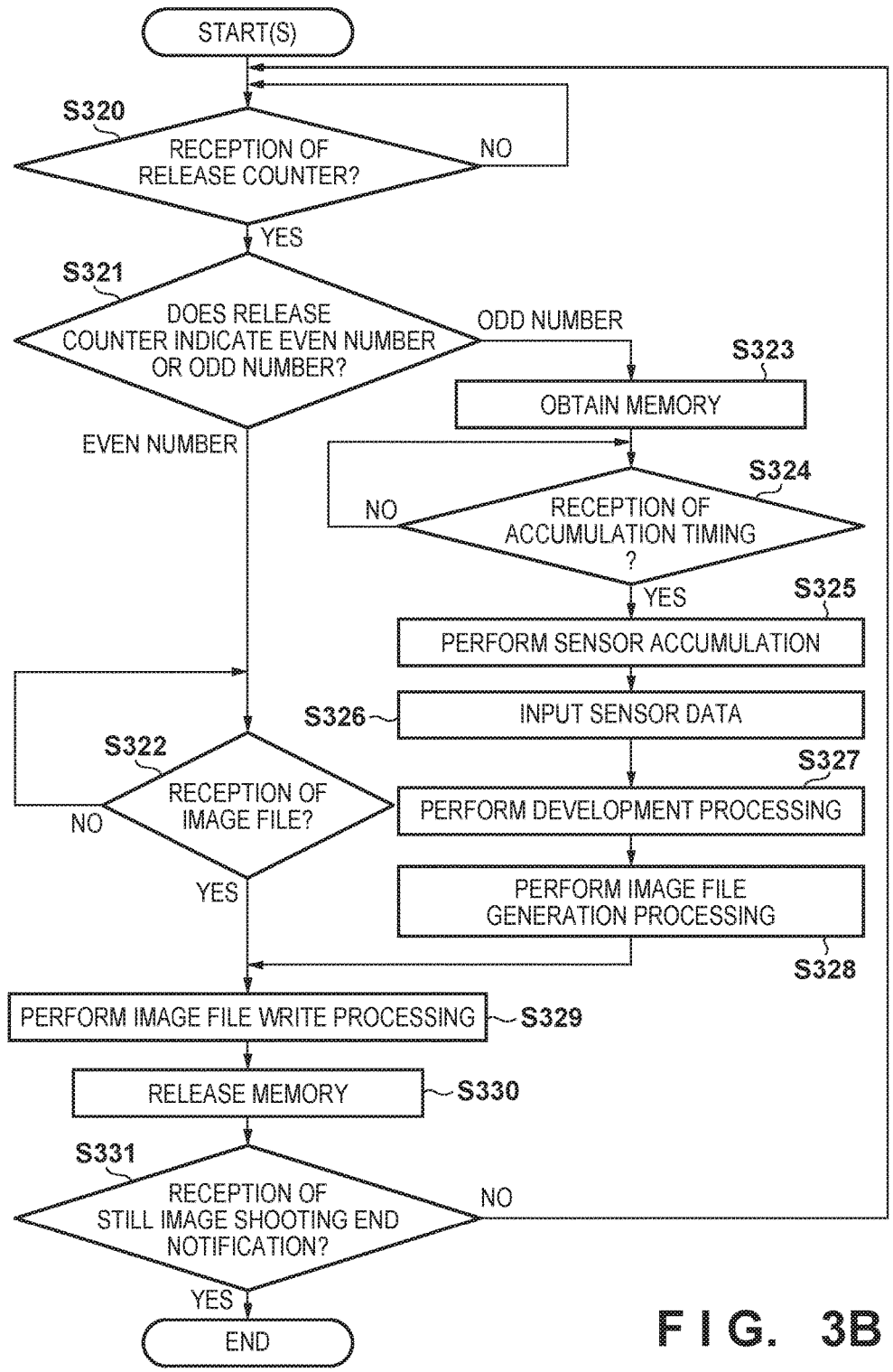

The full-frame alternate processing shown in FIGS. 3A and 3B will be described next. Although the full-frame alternate processing is mainly used in still image shooting in this embodiment, it may be applied to live view recording and moving image recording. Note that in FIGS. 3A to 6B, "M" denotes the preceding stage and "S" denotes the succeeding stage. Although the procedures of the preceding and succeeding stages are mainly executed by their respective system control units 107 and 127, processes performed in their respective image processing units are also included in the sequence.

The processing on the side of the preceding stage will be described first. First, the system control unit 107 determines whether the release counter, which serves as a reference in determining whether the processing is to be performed on the side of the preceding stage or on the side of the succeeding stage in the alternate processing, indicates an even number or an odd number (step S301). In this embodiment, the release counter is, for example, a counter to count the frame count since the shooting start instruction. The release counter can be, for example, a binary counter since it is sufficient for the release counter to specify every other frame, for example, an even-numbered frame or an odd-numbered frame. Alternatively, the release counter can be a flag indicating whether the processing will be performed in the preceding stage or the succeeding stage. In this embodiment, the processing is performed centrally on the side of the preceding stage if the release counter indicates an even number, and the processing is performed centrally on the side of the succeeding stage if an odd number is indicated. However, note that this arrangement may be reversed, as a matter of course. Hence, the initial value of the release counter is arbitrary, and configuration may be taken such that initialization is not performed.

If it is determined that the release counter indicates an even number in step S301, the sensor data input setting is switched to the side of the preceding stage (step S302), and the release counter is incremented (step S303). The switching of the input setting in step S302 can be performed by setting the sensor data separation unit 103 so that sensor data of one frame which is to be input will be transferred to the image processing unit 105. After the count value of the release counter is incremented, processing to transmit the count value to the side of the succeeding stage is performed (step S304). The count value of the release counter is transmitted, for example, to the image processing circuit 112 on the side of the succeeding stage via the communication unit 109.

Next, on the side of the preceding stage, memory obtainment is performed in preparation for processing (step S305), and the system control unit 107 waits for the accumulation timing (step S306). Memory obtainment is an operation to allocate a necessary memory space on, for example, the SDRAM 110. The accumulation timing is the timing in which charge accumulation is started in each image sensor forming the image capturing unit 101, and it may be, for example, a timing synchronized with the operation of the release button. In the case of still image continuous shooting, since the release button remains in a pressed state, the accumulation timing arrives at a predetermined cycle in the period from when the release button is pressed to when it is released. This timing may be determined, for example, by using a timer or by outputting a signal from the image capturing unit 101 at the timing in which charge accumulation for the next image is possible and determined based on this signal. When the sensor accumulation timing arrives, accumulation of charges and the like corresponding to the image is started in the image capturing unit 101 (step S307), and digitized sensor data is input from the image capturing unit 101 when accumulation is completed after a predetermined period (step S308). The sensor data is so-called RAW data.

Next, the input data undergoes development processing (step S309), and image file generation processing is performed (step S310). The processes of steps S309 and S310 are performed by the image processing unit 105. The types of processes to be performed can be set, for example, by providing parameters beforehand by a predetermined procedure (not shown). The completed image file is, for example, first stored in a memory and then transferred to the side of the succeeding stage (step S311). The transfer is performed, for example, via the communication unit 109 but may be performed via the output I/F unit 104. After the transfer is completed, the memory obtained on the SDRAM 110 is released (step S312), and the system control unit 107 determines whether still image shooting is to be ended (step S313). If it is determined that still image shooting is to be ended, a still image shooting end notification is transmitted to the side of the succeeding stage (step S314), and the processing ends. If still image shooting is not to be ended, the process returns to the release counter determination at the beginning of the processing. In step S313, for example, if the release button for still image shooting is not pressed, it can be determined that the still image shooting has ended. If the release button is pressed, it can be determined that the still image shooting has not ended.

In step S301, if it is determined that the release counter indicates an odd number, the input setting of the sensor data is switched to the succeeding stage (step S315) since the processing will be performed centrally on the side of the succeeding stage as described above, and the release counter is incremented (step S316). The switching of the input setting in step S315 can be performed by setting the sensor data separation unit 103 so that sensor data of one frame which is to be input will be transferred to the image processing circuit 112 of the succeeding stage via the output I/F unit 104.

Next, the processing to transmit the count value of the incremented release counter to the side of the succeeding stage is performed (step S317). Next, the system control unit waits for the accumulation timing (step S318) and transmits a notification when the accumulation timing arrives (step S319). Subsequently, the system control unit 107 determines whether the still image shooting is to be ended (step S313). If it is determined that the still image shooting is to be ended, a still image shooting end notification is transmitted to the side of the succeeding stage (step S314), and the processing ends. If still image shooting is not to be ended, the process returns to the release counter determination at the beginning of the processing.

The processing of the image processing circuit 112 on the side of the succeeding stage will be described next. The processing of the image processing circuit 112 on the side of the succeeding stage is performed by the system control unit 127 controlling each unit. The system control unit 127 determines whether a count value of the release counter has been received from the image processing circuit 100 on the side of the preceding stage (step S320). Upon receiving the count value of the release counter, the system control unit 127 determines whether the release counter indicates an even number or an odd number (step S321).

If it is determined that the release counter indicates an even number in the determination of step S321, processes until image file generation are performed on the side of the preceding stage. Hence, the system control unit 127 waits for the image file to be transferred to the side of the succeeding stage (step S322). When reception of the image file transmitted from the image processing circuit 100 is completed, the system control unit 127 performs image file write processing to the recording medium 124 (step S329), Subsequently, the system control unit releases the memory set on the SDRAM 123 (step S330) and determines whether there is a still image shooting end notification from the side of the preceding stage (step S331). If the still image shooting is to be continued, the process returns to the beginning. Otherwise, the processing ends.

On the other hand, if it is determined that the count value of the release counter is an odd number in step S321, the image processing circuit 112 needs to perform the processes until image file generation. In this case, the system control unit 127 performs memory obtainment (step S323) and waits for the accumulation timing notification to arrive (step S324). When the accumulation timing notification arrives, accumulation is started (step S325), and the sensor data is input when accumulation is completed after a predetermined period (step S326). The input sensor data, for example, sensor data of one frame is transferred from the sensor data separation unit 114 to the image processing unit 116.

Next, the input data undergoes development processing by the image processing unit 116 (step S327), and image file generation is performed (step S328). When the image file generation is completed, the system control unit 127 performs image file write processing to the recording medium 124 (step S329), releases the memory (step S330), and determines whether there is a still image shooting end notification from the side of the preceding stage (step S331). If still image shooting is to be continued, the process returns to the beginning. Otherwise, the processing ends.

The above-described procedures allow, for example, consecutive 4K2K images to be processed alternately in the image processing circuit 100 and the image processing circuit 112 and recorded in a recording medium.

<Full-Frame Preceding Stage Processing>

Figure 4A:
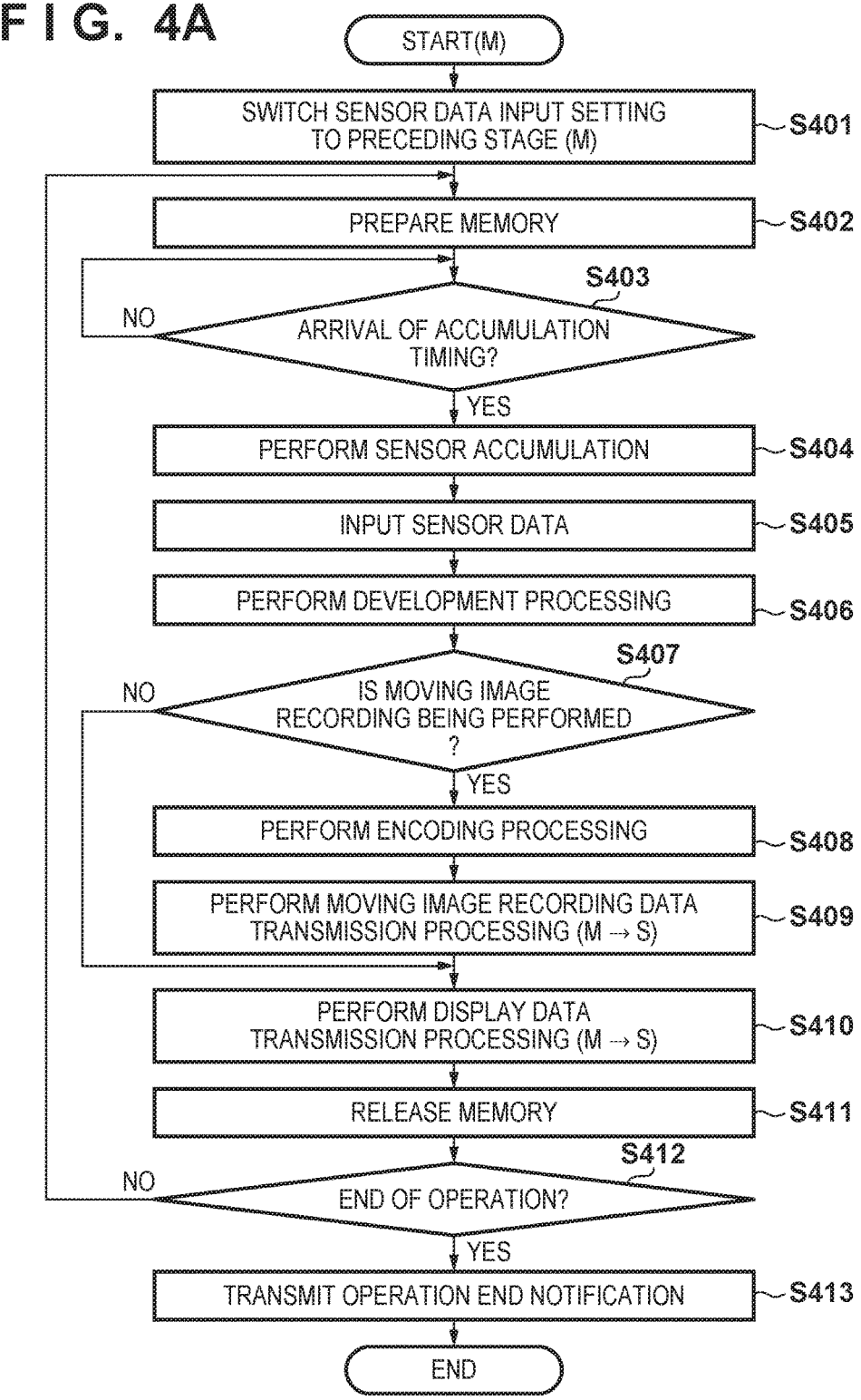
FIGS. 4A and 4B are flowcharts of full-frame preceding stage processing according to the embodiment of the present invention.
Figure 4B:
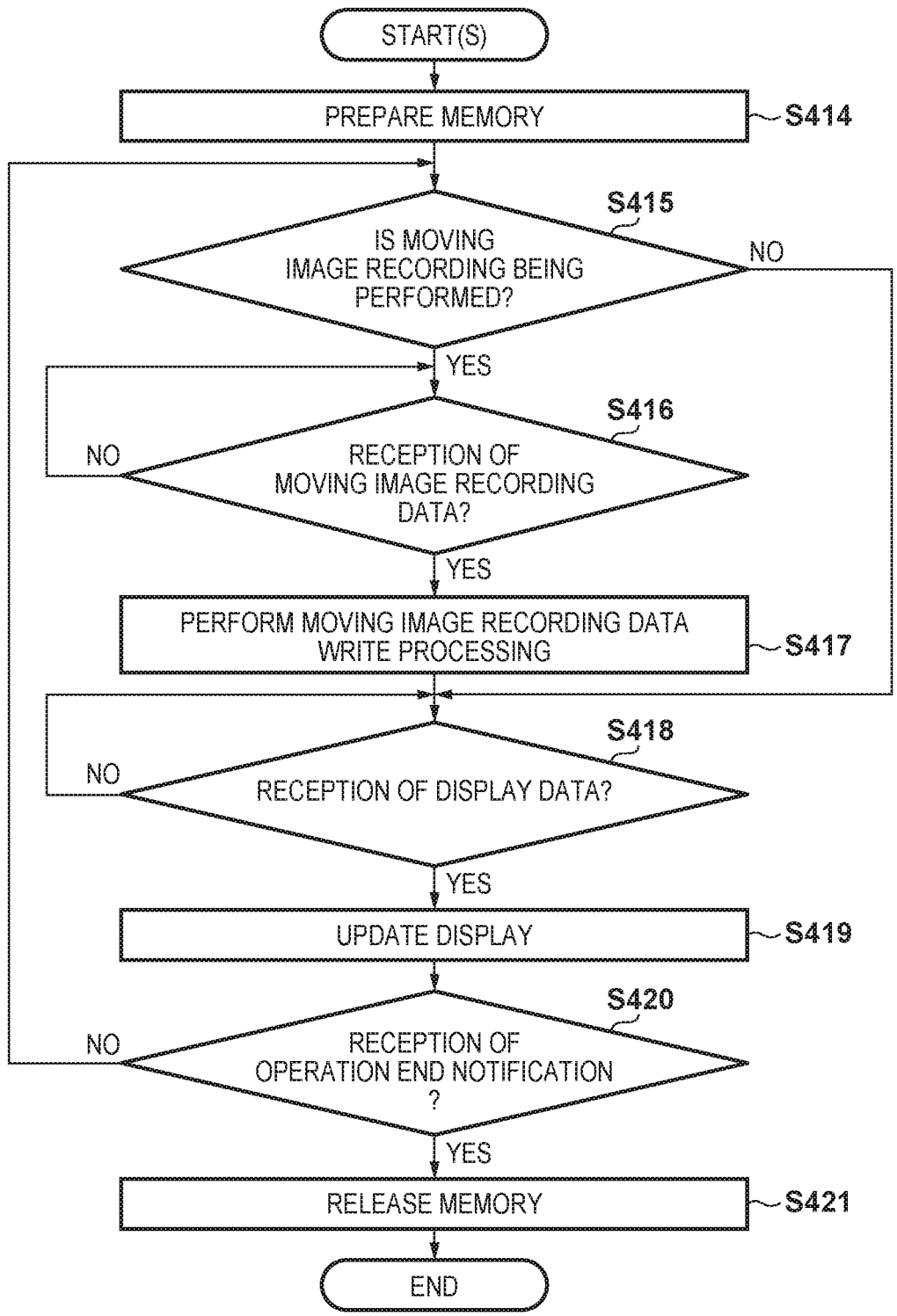

The full-frame preceding stage processing shown in FIGS. 4A and 4B will be described next. Although the full-frame preceding stage processing is mainly used in live view recording and moving image recording in this embodiment, it may be applied to still image shooting in scenes where the same kind of processing can be applied. Particularly, this can be considered to be almost the same as the case in which the development processing is performed in only the side of the preceding stage, regardless of whether the release counter indicates an even number or an odd number, in FIGS. 3A and 3B. Basically, in this processing, the duties are fixedly assigned to the side of the preceding stage and on the side of the succeeding stage, respectively; the duties assigned to the side of the preceding stage are the accumulation processing, the development processing, and the encoding processing, and the duties assigned to the side of the succeeding stage are the write processing and the display processing.

The processes on the side of the preceding stage will be described first. First, the sensor data input setting is switched to the side of the preceding stage (step S401).

Next, the memory to be used for the subsequent processing is obtained (step S402), and the system control unit 107 waits for the accumulation timing to arrive (step S403). When the accumulation timing arrives, sensor accumulation is started (step S404), and the sensor data is input when accumulation is completed after a predetermined period (step S405).

When the input of the sensor data is completed, the development processing is performed (step S406), and it is determined whether moving image recording is being performed (step S407). If it is determined that the moving image recording is being performed, encoding processing is performed on the result of the development processing (step S408). When the encoding processing is completed, the encoded data is transferred as moving image recording data to the side of the succeeding stage (step S409). Also, the image processing unit 105 generates display image data from the image data that has undergone the development processing, and the generated display image data is temporarily stored in the SDRAM 110. After the encoded image data is transferred, the display image data stored in the SDRAM 110 is transferred to the side of the succeeding stage (step S410). When the transfer is completed, the obtained memory is released (step S411), and the system control unit 107 determines whether the operation is to be ended (step S412). If the operation is to be ended, an operation end notification is transmitted to the side of the succeeding stage (step S413), and the processing ends. If it is determined that the operation is to be continued, the process returns to the memory obtainment process.

The processes of the side of the succeeding stage will be described next. First, memory preparation is performed for the data which is to be transferred (step S414). Next, the system control unit 127 determines whether moving image recording is being performed (step S415). If it is determined that the moving image recording is being performed, the system control unit waits for the moving image recording data to be transferred from the side of the preceding stage (step S416) and performs write processing upon receiving the data (step S417). The moving image recording operation is, for example, performed in step S209 of FIG. 2. Hence, the determination in step S415 can be performed by setting, immediately before the respective processes, pieces of information to identify whether the processing is the full-frame preceding stage processing to be performed in step S205 or the processing to be performed in step S209, and performing the determination based on the information. Next, the system control unit waits to receive a display data notification (step S418) and updates the display upon receiving the data (step S419). The determination of step S418 can also be performed in the manner of step S415.

Next, the system control unit 127 determines whether an operation end notification has been transmitted from the side of the preceding stage (step S420). If the operation end notification has been received, the obtained memory is released (step S421), and the processing ends. If it is determined that the operation is to be continued, the process returns to the determination as to whether moving image recording is being performed.

The full-frame succeeding stage processing shown in FIGS. 5A and 5B will be described next. Although the full-frame succeeding stage processing is also mainly used in live view recording and moving image recording in this embodiment, it is not limited to these recording operations in scenes where the same kind of processing can be applied to still image shooting. Particularly, this can be considered to be almost the same as the case in which the development processing is performed in only the side of the succeeding stage, regardless of whether the release counter indicates an even number or an odd number, in FIGS. 3A and 3B. Basically, in this processing, duties are fixedly assigned to the side of the preceding stage and to the side of the succeeding stage, respectively; the duties assigned to the side of the preceding stage are, at most, the processing to set the sensor data input setting, and the duties assigned to the side of the succeeding stage are the accumulation processing, the development processing, the encoding processing, the write processing, and the display processing.

The processing on the side of the preceding stage will be described first. First, the sensor data input setting is switched to the side of the succeeding stage (step S501). Next, the image processing circuit of the preceding stage need only wait for the arrival of the operation end timing (step S502), and a notification is transmitted to the side of the succeeding stage when the desired timing arrives (step S503) and the processing ends.

The processing on the side of the succeeding stage will be described next. First, memory obtainment is performed in preparation for the subsequent processes (step S504), and the system control unit 127 waits for the accumulation timing to arrive (step S505).

When the accumulation timing arrives, sensor accumulation is started (step S506), and the sensor data is input when accumulation is completed after a predetermined period (step S507).

When the input of sensor data is completed, the system control unit performs development processing (step S508) and determines whether moving image recording is currently being performed (step S509). If it is determined that moving image recording is being performed, encoding processing is performed on the result of the development processing (step S510). When the encoding processing is completed, moving image recording data write processing is performed (step S511). The image processing unit 116 generates display image data from the image data that has undergone the development processing and temporarily stores the generated display image data in the SDRAM 123. The display image data is read out from the SDRAM 123 and the display is updated (step S512). Subsequently, the system control unit 127 determines whether an operation end notification has been received from the side of the preceding stage (step S513). If the operation end notification has been received, the obtained memory is released (step S514), and the processing ends. If it is determined that the operation is to be continued, the process returns to the determination as to whether moving image recording is being performed.

Although the full-frame preceding stage processing and the full-frame succeeding stage processing have been described in this embodiment, only one of the processes may be performed or the processes may be performed by switching between the processes in steps S205 and S209 in FIG. 2.

<Half-Frame Parallel Processing>

The half-frame parallel processing shown in FIGS. 6A and 6B will be described next. Basically, in this embodiment as well, the duties, that is, the processing targets, are fixedly assigned to the respective preceding and succeeding stages. The duties assigned to the side of the preceding stage are accumulation, development processing of a Lower (a lower half of the sensor data) portion, and encoding processing. On the other hand, the duties assigned to the side of the succeeding stage are development processing of an Upper (an upper half of the sensor data) portion, encoding processing, combining processing, write processing, and display processing. When recording a moving image having a frame size of 3840 horizontal pixels×2160 vertical pixels and a frame rate of 60 fps (4K60P moving image recording) with the heaviest processing load, this embodiment aims to reduce the load by switching to this division of duties in order to halve the entire sensor data that is to be the processing target in each of the preceding and the succeeding stages. Note that although it has been described that the sensor data will be halved into the Lower portion and the Upper portion, the data is not strictly halved in this embodiment, and it is assumed that the data of the Lower portion will include, to some extent, the data of the Upper portion and the data of the Upper portion will include, to some extent, the data of the Lower portion. This is because in the processing of the central portion where the sensor data is precisely halved, the Lower portion requires the data of Upper portion to some extent, and the Upper portion requires the Lower portion to some extent. Each image processing circuit has the capability to process image data that includes the overlapping portion, as a matter of course.

The processing on the side of the preceding stage will be described first. First, the sensor data input setting is switched to the side of the preceding stage (step S601). Next, memory obtainment is performed in preparation for the succeeding processes (step S602), and the system control unit 107 waits for the accumulation timing to arrive (step S603).

When the accumulation timing arrives, sensor accumulation is started (step S604), and the sensor data is input when accumulation is completed after a predetermined period (step S605).

When the input of sensor data has been completed, the Upper portion of the sensor data (the upper half of the sensor data) is separated and transferred to the side of the succeeding stage (step S606), and the remaining Lower portion of the sensor data (the lower half of the sensor data) undergoes development processing (step S607). The transfer of the Upper portion to the succeeding stage can be performed via the communication unit 109 or the output I/F unit 104. Also, the transfer may be started before the reception of the data of one frame is completed. Next, encoding processing is performed on the result of the development processing (step S608). When the encoding processing has been completed, the generated moving image recording data that has undergone image processing is transferred to the side of the succeeding stage (step S609). The display image data that is stored in the SDRAM 110 and is generated from the image data, which has undergone development processing, is also transferred to the side of the succeeding stage (step S610).

The obtained memory is released when all of the transfer operations have been completed (step S611), and the system control unit 107 determines whether the operation is to be ended (step S612). If it is determined that the operation is to be ended, an operation end notification is transmitted to the side of the succeeding stage (step S613), and the processing ends. If it is determined that the operation is to be continued, the processing is restarted from the aforementioned memory obtainment. The end of the operation can be determined based on, for example, a moving image recording switch of the image capturing apparatus being released.

The processing on the side of the succeeding stage will be described next. First, memory obtainment is performed in preparation for the processes to be performed in the succeeding stage (step S614), and the system control unit 127 waits for the separated data to be transferred (step S615). When the Upper portion (the upper half of the sensor data) is received from the preceding stage, the development processing of the received data is performed (step S616). Next, encoding processing is performed on the result of the development processing (step S617). When the encoding processing has been completed, the system control unit 127 waits for the Lower portion (the lower half of the sensor data) of the (moving image recording) data which has undergone the encoding processing to be transferred from the side of the preceding stage (step S618).

When the above-described data is received, combining processing (step S619) of the image-processed (moving image recording) data which has undergone the encoding processing of the Upper portion (the upper half of the sensor data) and that of the Lower portion (the lower half of the sensor data) is performed, thereby forming full-frame data.

When the moving image recording data write processing is performed (step S620), the system control unit 127 waits for the display data of the Lower portion (the lower half of the sensor data) to be transferred from the side of the preceding stage in the same manner (step S621). When the display data of the lower half (the Lower portion) of one frame is received, combining processing of the developed Upper portion (the upper half of the sensor data) and the received Lower portion (the lower half of the sensor data) is performed (step S622). The display is updated by using the data of a full frame generated as a result of the aforementioned combining processing (step S623).

Next, it is determined whether an operation end notification has been received from the side of the preceding stage (step S624). If the operation is to be ended, the memory is released (step S625), and the processing ends. If the operation is to be continued, the process returns to the process (step S615) in which the system control unit 127 waits for the separated data to be transferred.

According to the above-described embodiment, control is performed in a plurality of image processing circuits by switching between full-frame processing and half-frame parallel processing in accordance with the camera settings and the processing load. As a result, it is possible to suitably distribute the processing load of each image processing circuit, and it is possible to provide an image capturing apparatus that can flexibly cope with the increasing processing load.

For example, when moving image recording processing of 4K30P is to be executed, assume that the processing is to be executed by half-frame parallel processing. In this case, since the processing load of the image processing circuit of each of the preceding stage and the succeeding stage is to correspond to 2K30P, a time in which it is possible to set one of the image processing circuits in an idle state is generated. However, even if the amount of the processing-target image data is halved, the processing time of each image processing circuit is not necessarily halved due to accompanying fixed processing or the like. Also, a time is also required for the power-off processing and the return processing of the image processing circuit. Hence, even if the half-frame parallel processing is executed when the load processing load is light, the power-saving effect by setting the power supply of one of the image processing circuits to OFF during the time in which an idle state is possible will be small.

According to this embodiment, in a case in which the processing load is comparatively light, the full-frame processing can be applied so that the clock of an unused image processing circuit can be dropped to set the unused image processing circuit to a power-saving mode or the connected SDRAM can be set to a self-refreshing state to change to an inactive mode.

That is, an image processing circuit need not be operated more than necessary and it is possible to suppress the power consumption of the overall camera.

In addition, in a case in which the processing load is comparatively heavy, the aforementioned half-frame parallel processing can be applied to cause the image processing circuits to operate in parallel to suitably distribute the processing load to each circuit. As a result, it is possible to provide an image capturing apparatus that can flexibly cope with an increasing processing load, and in total, it is possible to execute suitable and efficient control, in terms of processing efficiency and power use efficiency, in accordance with the operation state of the camera.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-026363, filed Feb. 15, 2017 which is hereby incorporated by reference herein in its entirety.

What is claimed is:

1. An image processing apparatus comprising:
a first image processing circuit configured to perform image processing on image data output from an image sensor; and
a second image processing circuit configured to perform image processing on the image data output from the image sensor,
wherein
in a first processing mode for outputting a still image by performing the image processing on the image data output from the image sensor, the first image processing circuit and the second image processing circuit alternately performs the image processing on the image data output from the image sensor on a frame-by-frame basis, and
in the second processing mode for outputting a moving image by performing the image processing on the image data output from the image sensor, the first image processing circuit performs the image processing on a first portion of the image data of one frame, the second image processing circuit performs the image processing on a second portion of the one frame which is different from the first portion, and the processed portions of the image data are combined.

2. The apparatus according to claim 1, wherein in a case that a data rate of the moving image is not more than a predetermined data rate by performing the image processing on the image data output from the image sensor one of the first image processing circuit and the second image processing circuit performs the image processing on the image data of each frame.

3. The apparatus according to claim 1, wherein in the second processing mode, the first image processing circuit divides the image data output from the image sensor into the first portion and the second portion, unit transfers the second portion to the second image processing circuit, performs the image processing on the first portion of the image data, and transfers the processed first portion of the image data to the second image processing circuit, and
the second image processing unit performs the image processing on the second portion of the image data received from the first image processing unit and combines the processed first portion received from the first circuit and the processed second portion.

4. The apparatus according to claim 1, wherein the first portion of the image data is a portion on a lower side of the image data and the second portion of the image data is a portion on an upper side of the image data.

5. An image capturing apparatus comprising:
an image sensor; and
an image processing apparatus defined in claim 1.

6. An image capturing apparatus comprising:
an image sensor;
a first image processing circuit configured to receive image data from the image sensor; and
a second image processing circuit that is cascade-connected to the first image processing circuit and configured to output a processed image data, wherein
in a case that the image data from the image sensor is processed as a first moving image, a data rate of the first moving image which exceeds a predetermined data rate, the first image processing circuit 1) processes a first portion of each frame of the image data and 2) transfers a second portion of each frame of the image data to the second image processing circuit without processing the second portion by the first image processing circuit, and the second image processing circuit processes 1) the second portion of each frame of the image data, 2) combines the first portion processed by the first image processing circuit with the second portion processed by the second image processing circuit and 3) outputs the combined image data to a recording medium,
in a case that the image data from the image sensor is processed as a second moving image, a data rate of the second moving image which does not exceed the predetermined data rate, one of the first image processing circuit and the second image processing circuit processes the image data of each frame and the second image processing circuit outputs the processed image data to the recording medium,
in a case that the image data from the image sensor is processed as a still image, the image data of one frame of every other frame from the image capturing unit is processed by the first image processing circuit and the image data of a frame other than the one frame is transferred to the second image processing circuit and the second image processing circuit outputs the processed image data to the recording medium.

* * * * *